FIG. IA
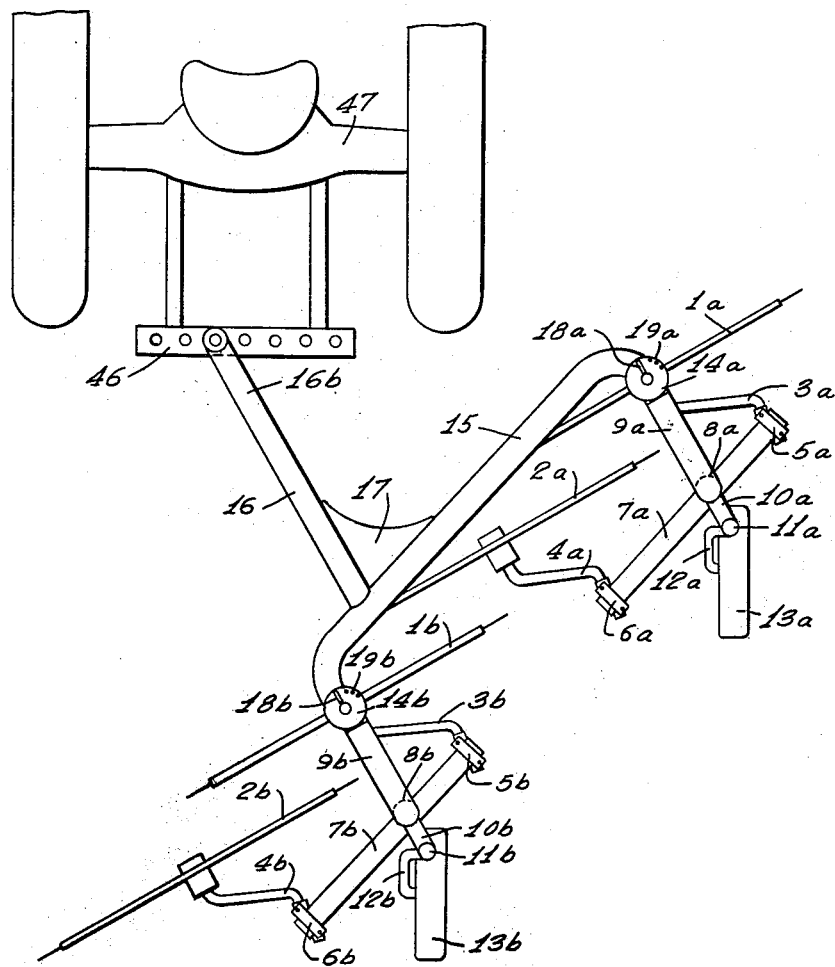

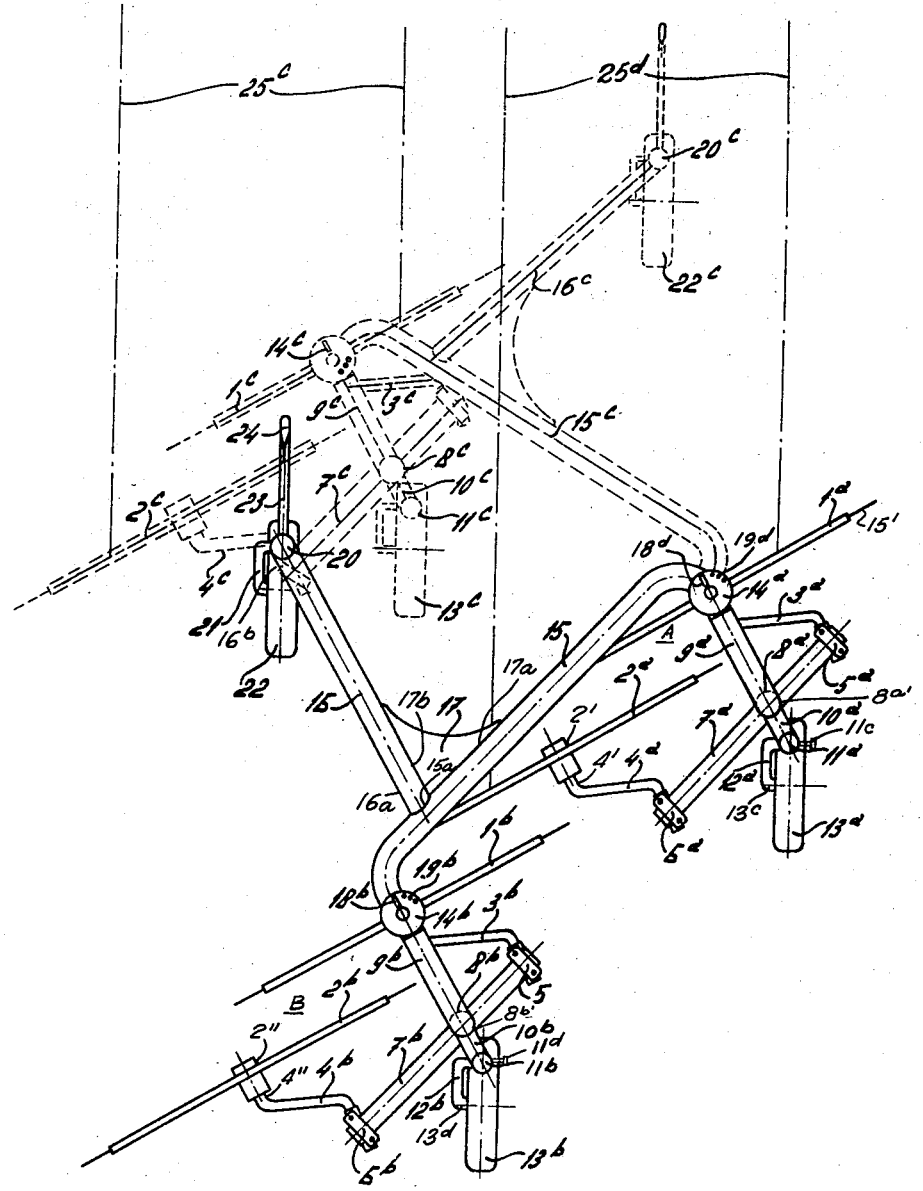

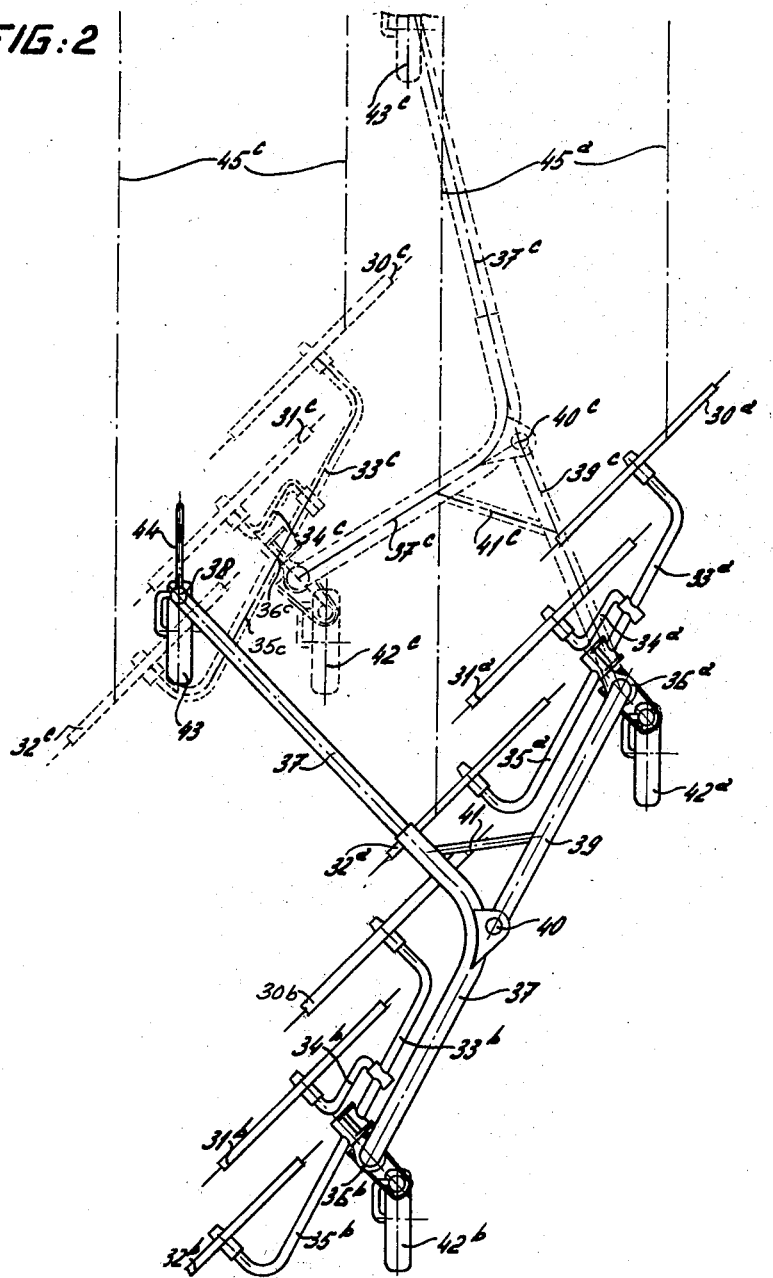

Jan. 6, 1959   C. VAN DER LELY ET AL   2,867,072
SIDE DELIVERY RAKE AND SWATH TURNER
Filed July 29, 1953   4 Sheets-Sheet 4

United States Patent Office 2,867,072
Patented Jan. 6, 1959

2,867,072

SIDE DELIVERY RAKE AND SWATH TURNER

Cornelis van der Lely and Ary van der Lely, Maasland, Netherlands, assignors to C. van der Lely N. V., Maasland, Netherlands, a limited company of the Netherlands Application July 29, 1953, Serial No. 371,008

Claims priority, application Netherlands August 2, 1952

9 Claims. (Cl. 56—377)

This invention relates to side delivery rakes adapted to be used as swath turners and comprising a mobile frame provided with a number of rake wheels which are rotated by contact with the ground during the ground traversing movement, and which are divided into at least two groups.

An object of the invention is to provide the above-mentioned type of side delivery rake with a very compact and lightweight frame so as to minimize the required tractive power. Thus, according to an embodiment of the invention, the frame is provided with a number of vertical axles corresponding to the number of groups of rake wheels, each of these axles constituting the pivotal axis for a support which carries a group of rake wheels. Locking means are further provided near the axles to secure the supports in desired position.

Advantageously, in accordance with the invention, rake wheels can be mounted and arranged as groups having controllably varying spacing.

The invention will be hereinafter more fully described with reference to the accompanying drawings, in which preferred embodiments of a side delivery rake in accordance with the invention are shown by way of example and in which:

Fig. 1 shows a plan view of a first embodiment;

Fig. 1a shows a plan view of a variant of the first embodiment in which the rake is drawn by a tractor.

Fig. 2 shows a plan view of a second embodiment;

Figure 3:
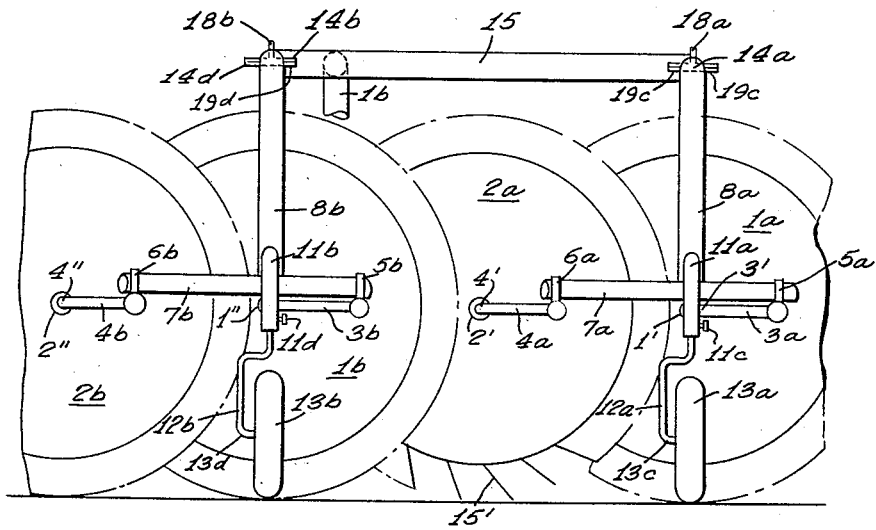
Fig. 3 is a fragmentary elevational view of the device of Fig. 1, as viewed in the direction of the arrow III on the latter.

Referring to Figs. 1 and 3 of the drawings, the embodiment there illustrated is seen to include overlapping rake wheels $1^a$, $2^a$, $1^b$, $2^b$ of a side delivery rake which are divided into two groups, the rake wheels $1^a$ and $2^a$ constituting one group A and the rake wheels $1^b$ and $2^b$ constituting an adjacent group B. The hubs $1'$, $2'$, $1''$, $2''$ of said rake wheels are pivotally mounted respectively on the pins $3'$, $4'$, $3''$, $4''$ of cranks $3^a$, $4^a$, $3^b$ and $4^b$ which are separate means respectively mounted in bearings $5^a$, $6^a$, $5^b$ and $6^b$. The bearings $5^a$ and $6^a$ and the bearings $5^b$ and $6^b$ are respectively secured to horizontal tubes $7^a$ and $7^b$. The tubes $7^a$ and $7^b$ carry vertical tubes or pivots $8^a$ and $8^b$ which are bent at their upper ends at $8^{a'}$ and $8^{b'}$ to form horizontal tubes $9^a$ and $9^b$. The tubes $8^a$ and $8^b$ are provided with lateral pieces $10^a$ and $10^b$, respectively, carrying vertical tubes $11^a$ and $11^b$, respectively. In said vertical tubes $11^a$ and $11^b$, bars $12^a$ and $12^b$, respectively, are rotatably mounted at their upper ends. The horizontal lower ends of said bars constitute the axles $13^c$ and $13^d$ of running wheels $13^a$ and $13^b$. The wheels $13^a$ and $13^b$ are castor wheels as long as the rotation of the rods $12^a$ or $12^b$ in the tubes $11^a$ and $11^b$ is not prevented. Rotation of the bar $12^a$ or $12^b$ with regard to the tube $11^a$ or $11^b$ is, however, rendered impossible during operation of the device for one of said running wheels by means of the locking device $11^c$ or the locking device $11^d$. The locking devices, which are shown diagrammatically, can be any of the conventional devices for preventing rotation between a shaft and an associated member, one of such devices being shown in Patent 2,469,570 by W. E. Parish (May 10, 1949).

The horizontal tubes or wheel supported frames $9^a$ and $9^b$ are connected, by means of adjustable pivots or hinge joints $14^a$ and $14^b$ having vertical hinge axes, to both extremities of a main frame member or tube 15 forming part of the frame of the side delivery rake. Said frame further comprises a tube 16 welded at $15^a$ in transverse direction to the tube 15, a plate 17 being welded at $17^a$ and $17^b$ in the angle between said tubes 15 and 16. The hinge joints or circular members $14^a$ and $14^b$ are located at such elevation above the ground that said joints, as well as the tube 15, will not come into contact with the circumferential teeth $15'$ of the rake wheels during the movements of the cranks which may occur when the device is in operation.

Rotation of the tubes $9^a$ and $9^b$ in relation to the tube 15 about the vertical axes of the lockable pivot means including the hinge joints $14^a$ and $14^b$ may be rendered impossible by inserting locking members $18^a$ and $18^b$, respectively, in vertical direction through one of the holes $19^a$ and $19^b$ provided in circular members $14^a$ and $14^b$ secured to the tubes $9^a$ and $9^b$, respectively, and through a corresponding hole $19^c$, $19^d$ provided in similar members $14^c$, $14^d$ respectively, secured to the tube 15. When the locking members $18^a$ and $18^b$ are withdrawn, the tubes $9^a$ and $9^b$ including the groups of rake wheels $1^a$, $2^a$ and $1^b$, $2^b$ may be turned about the vertical hinge axes, so as to vary the position of the rake wheels with respect to the travelling direction, the separate means 3 and 4 maintaining a constant inter-relationship and relationship to the associated members $7^a$ and 6.

The extremity $16^a$ of the arm 16 which is connected to the tube 15 is situated at a higher elevation than the other extremity $16^b$ of said arm. Said other extremity $16^b$ carries a vertical tube 20 in which the vertical upper end of a bar 21 is rotatably mounted. The lower end of said bar is horizontal and constitutes the axle of a third running wheel 22. To the vertical part of the bar 21 just below the tube 20 is secured a horizontal bar 23 the free end of which is bent upwards and backwards to form a draw hook 24. The tractive force applied to the draw hook 24 by an animal or by a tractor keeps the running wheel 22 in a suitable position and is transmitted to the tube 20 by draft means such as the bars 23 and 21, so that said force acts at such a point of the frame that this point and both vertical axes of the hinge joints $14^a$ and $14^b$ have a fixed position to each other in the frame. By this arrangement a very simple frame structure is obtained.

In the position indicated by full lines on Fig. 1, the device will operate as a side delivery rake. It may be transformed into a swath turner by turning the tubes $9^a$ and $9^b$ with regard to the tube 15 through equal angles to the left and by locking the parts in the new position by means of the locking members $18^a$ and $18^b$.

The position as a swath turner has been indicated in Fig. 1 by dotted lines, with the exception of the rake wheels $1^a$ and $2^a$, the running wheel $13^a$, the tube $9^a$ and the parts interconnecting said members, said members and parts taking the position as shown for the side delivery rake. The members and parts indicated by dotted lines have been designated by corresponding reference numerals to which the letter "c" has been added.

In the position as a swath turner the rake wheels $1^a$ and 2ᵃ will turn the swath 25ᵃ and the rake wheels 1ᶜ and 2ᶜ will turn the swath 25ᶜ. The travelling direction is in the drawing the same for the device both as a side delivery rake and as a swath turner; however, the foremost running wheel takes different positions in relation to the tube 16 (22 respectively 22ᶜ) for both cases. If the device is drawn by a tractor, the wheel 22 may be omitted, since in this case the tube 20 may be carried by the draw beam 46 of the tractor 47, as has been shown in Fig. 1a. The connection, in itself, is conventional as shown in Patent 2,618,921 (Nov. 25, 1952) to H. W. Riley.

Figure 4:
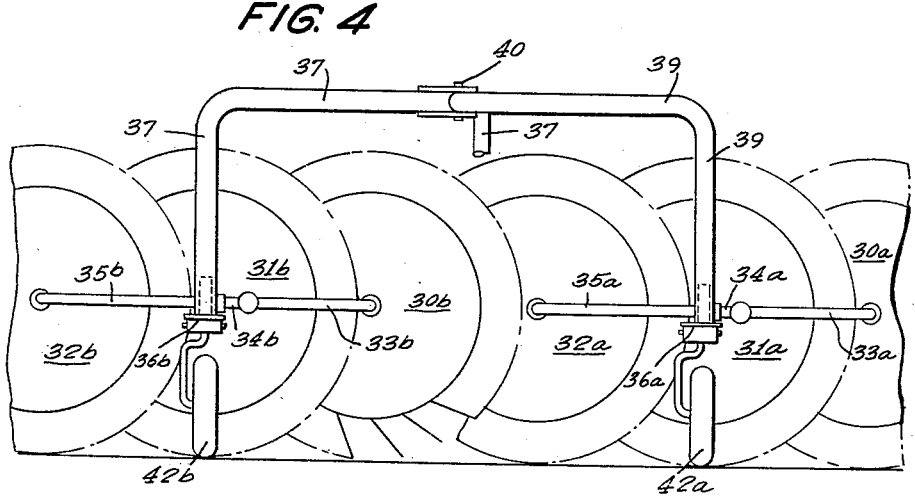
Fig. 4 is a view similar to that of Fig. 3, but showing the device of Fig. 2, as viewed in the direction of the arrow IV on the latter.

In the side delivery rake illustrated in Figs. 2 and 4, the rake wheels have been divided also into two groups, specifically, the group made up of the rake wheels 30ᵃ, 31ᵃ, 32ᵃ and the group made up of the rake wheels 30ᵇ, 31ᵇ, 32ᵇ.

The rake wheels are respectively fixed to cranks 33ᵃ, 34ᵃ, 35ᵃ and 33ᵇ, 34ᵇ, 35ᵇ with the cranks 34ᵃ and 34ᵇ being relatively short and mounted on the cranks 33ᵃ and 33ᵇ, the last mentioned cranks being mounted in turn on the cranks 35ᵃ and 35ᵇ. Finally the cranks 35ᵃ and 35ᵇ are respectively mounted on supports 36ᵃ and 36ᵇ which are connected to the frame to be rotatable about vertical axes. The frame is substantially composed of two tubes; one of said tubes, identified by the numeral 37, has a horizontal middle part and an extremity which is bent downwardly and connected to the support 36ᵇ rotatable about a vertical axis. This rotation can be rendered impossible when desired by suitable locking means (not shown). The other tube part 37' is first bent in a horizontal plane and then downwardly inclined and secured with its end to a vertical tube 38. The other tube 39 of the frame has a horizontal extremity which is hingedly connected to the tube 37 to be rotatable relative to the latter about a vertical axis 40, whereas its other extremity is vertical and is connected to the support 36ᵃ rotatable about a vertical axis. The rotation of support 36ᵃ relative to the tube 39 about this vertical axis can be rendered impossible, when desired, by suitable locking means (not shown). A bar 41 which is detachably secured by conventional means (not shown) at its ends to the tubes 37 and 39 serves to fix said tubes in their relative positions.

The supports 36ᵃ and 36ᵇ are carried by self-adjusting running wheels 42ᵃ and 42ᵇ; one of said wheels may be directionally locked during operation of the device. The tube 38 carries a third running wheel 43 and a draw hook 44.

In the position indicated by full lines in Fig. 2 the device will operate as a side delivery rake. It may be transformed into a swath turner by turning support 36ᵇ to the left. However, the distance between the groups of rake wheels in a direction at right angles to the travelling direction will then not correspond to the usual distance between the swaths. The device provides for the reduction of this distance by turning the tube 39 with regard to the tube 37 about the axis 40. This position of the frame for the device acting as a swath turner has ben indicated in Fig. 2 substantially by dotted lines, with the parts and members of the device which are displaced from their original positions being designated by corresponding reference numerals to which the letter "c" has been added. The running wheel 43ᶜ will run between the swaths 45ᵃ and 45ᶜ which will be turned by the groups of the rake wheels. One of the running wheels 42ᵃ and 42ᶜ is directionally locked in the position shown in Fig. 2 during the operation of the device as a swath turner.

After having adjusted the desired angle between the tubes 37ᶜ and 39ᶜ by means of the detachable bar 41ᶜ, the rake wheels 30ᵃ, 31ᵃ and 32ᵃ are arranged in parallel relation to the rake wheels 30ᶜ, 31ᶜ and 32ᶜ, and the hinge connections between the support 36ᶜ and the tube 37ᶜ and between the support 36ᵃ and the tube 39ᶜ, are locked by means of locking devices not shown in the drawing but which are of the same kind as the locking devices 18ᵃ and 19ᵃ of the device shown in the Figs. 1 and 2.

What we claim is:

1. A raking device comprising a main frame including a laterally extending draft means, two wheel supported frames, at least one raking wheel on each of said two wheel supported frames, the wheels being arranged in overlapping relationship, adjustably lockable pivot means interconnecting each of said wheel supported frames to said main frame whereby the relative positions of the frames are adjustable and a running wheel coupled to said draft means for facilitating ground traversing movement.

2. A raking device as claimed in claim 1, wherein said wheel supported frames each include a running wheel, comprising a locking device operatively coupled with each said running wheel for fixing the same in position relative to the associated wheel supported frame.

3. A raking device as claimed in claim 1 comprising a crank operatively coupled to each of said wheel supported frames for supporting all of the raking wheels associated therewith.

4. A raking device as claimed in claim 1 comprising separate means for supporting the rake wheels on the wheel supported frames, said separate means being coupled to the wheel supported frames and having substantially a constant relationship thereto in all working arrangements of said device.

5. A raking device comprising a main frame including a laterally extending draft means, two frames, at least one raking wheel on each of said two frames, the wheels being arranged in overlapping relationship and adjustably lockable pivot means interconnecting each of said frames to said main frame whereby the relative positions of the frames are adjustable and a running wheel coupled to said draft means for facilitating ground traversing movement.

6. A device as claimed in claim 5 wherein said main frame comprises a tube supporting said draft means and a tube coupled to said two frames, the first said tube being rigidly connected with the second said tube and extending at a transverse direction thereto.

7. A device as claimed in claim 5 wherein the draft means and pivot means are located at the apices of a triangle.

8. A device as claimed in claim 1 wherein said main frame comprises a tube supporting said draft means and a tube coupled to said two frames, the first said tube being rigidly connected with the second tube and extending at a transverse direction thereto.

9. A device as claimed in claim 1 wherein the draft means and pivot means are located at the apices of a triangle.

References Cited in the file of this patent

UNITED STATES PATENTS

| | | |
|---|---|---|
| 2,472,260 | Morrill | June 7, 1949 |
| 2,481,995 | Godley | Sept. 13, 1949 |
| 2,618,921 | Riley et al. | Nov. 21, 1952 |
| 2,635,411 | Hicks | Apr. 21, 1953 |
| 2,680,343 | Enos | June 8, 1954 |

FOREIGN PATENTS

| | | |
|---|---|---|
| 986,330 | France | Mar. 21, 1951 |